March 18, 1941.     F. H. GULLIKSEN     2,235,403
SPEED REGULATOR
Filed July 25, 1939     2 Sheets-Sheet 1

WITNESSES:
Edward Michaels
Wm. C. Groome

INVENTOR
Finn H. Gulliksen.
BY
Franklin E. Hardy
ATTORNEY

March 18, 1941.  F. H. GULLIKSEN  2,235,403

SPEED REGULATOR

Filed July 25, 1939  2 Sheets-Sheet 2

WITNESSES:
Edward Michaels
Nw. C. Groove

INVENTOR
Finn H. Gulliksen.
BY
Franklin E. Hardy
ATTORNEY

Patented Mar. 18, 1941

2,235,403

UNITED STATES PATENT OFFICE 2,235,403

SPEED REGULATOR

Finn H. Gulliksen, Pittsburgh, Pa., assignor to Westinghouse Electric & Manufacturing Company, East Pittsburgh, Pa., a corporation of Pennsylvania Application July 25, 1939, Serial No. 286,313

7 Claims. (Cl. 171—119)

My invention relates to speed-regulator systems and has particular relation to regulator systems for governing the speeds of dynamo-electric machines in accordance with the speed of a speed-reference means.

In many applications, as, for example, when an electric generator is to be connected to a power line, it is necessary that the speed of the generator be such that the frequency of the alternating voltage of the generator be in synchronism with the frequency of the line before connecting the generator to the system. It is frequently desirable to match the speed of the incoming machine with the system frequency automatically as in the case of automatic stations where attendants are unavailable.

Speed-matching devices have been employed for regulating the speed of a dynamo-electric machine relative to the frequency of a circuit to which it is to be connected. Such devices have, in general, been expensive to build low in sensitivity and have not been responsive to the phase angle variations between the two sources of alternating current energy and have required the use of amounts of power which place a relatively large volt-ampere burden on the voltage transformers supplying the frequencies responsive to the two sources, thus requiring the use of special transformer apparatus.

It is an object of the invention to provide speed matching equipment that matches the speed of the incoming machine with respect to the frequency of the power system with absolute accuracy, and also controls the phase angle between the machine and the line to which the machine is to be connected to within a very small phase angle displacement thus facilitating synchronizing.

It is a further object of the invention to provide a speed matching equipment having a low volt-ampere burden on the potential transformers, thus permitting the operation thereof from the condenser bushings.

It is a further object of the invention to provide speed matching equipment of the character indicated that is low in cost and that does not require adjustment upon being placed in service.

Figure 1:
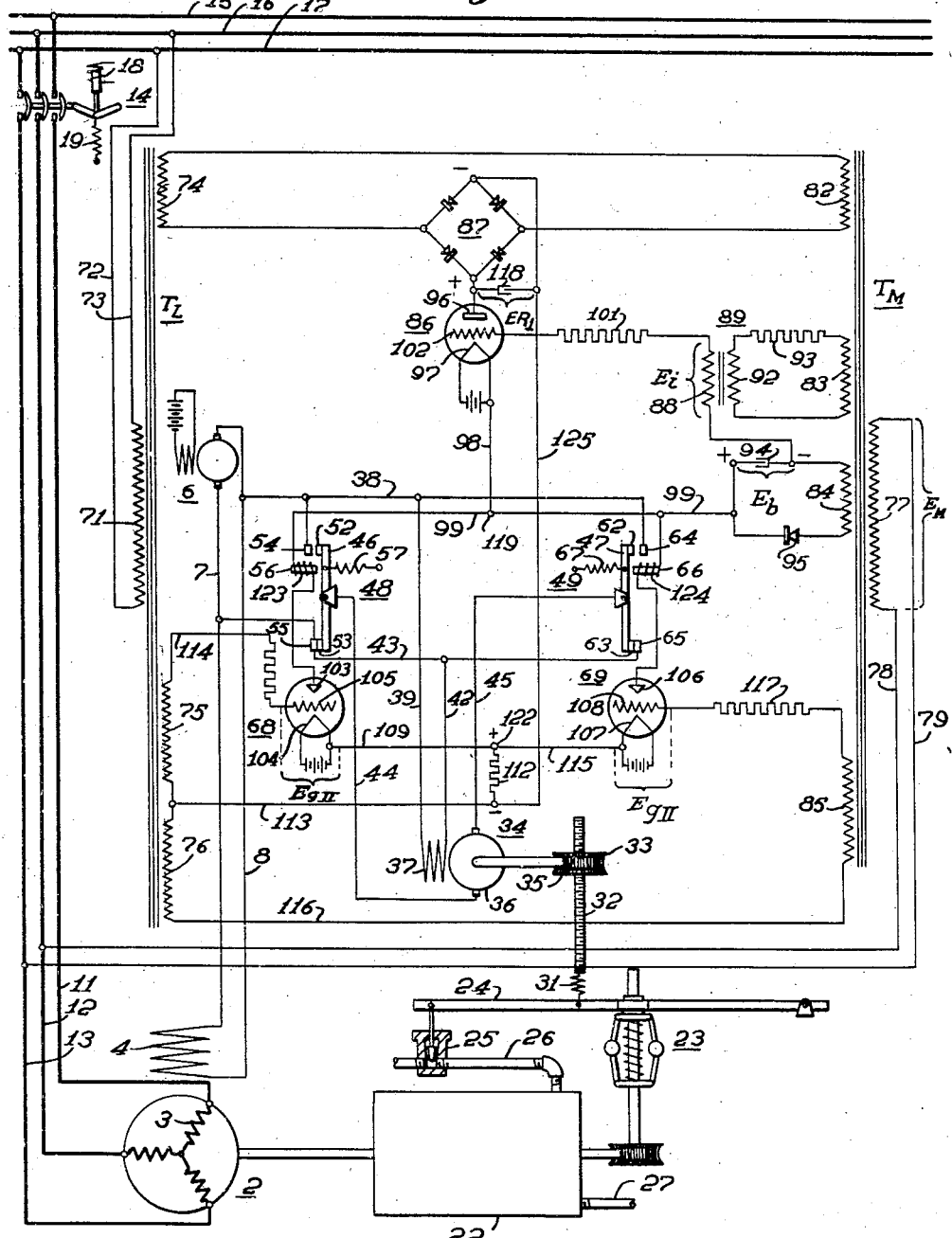

Other objects and advantages of the invention will be apparent from the following description of a preferred embodiment thereof, reference being had to the accompanying drawings in which:

Figure 1 is a diagrammatic view of apparatus and circuits employed in one embodiment of the invention, and Figs. 2, 3, 4 and 5 illustrate curves showing various relationships between certain parts of the system.

Referring to Figure 1 of the drawings, an electric generator 2 is illustrated having an armature winding 3 and a field winding 4 that is energized from any convenient source, such as an exciter generator 6. The field winding circuit extends from one terminal of the exciter generator 6 through conductor 7, the field winding 4 and conductor 8 to the other terminal of the exciter generator 6. The generator armature winding 3 is connected by means of three phase circuit conductors 11, 12 and 13 and a circuit breaker 14 to power line conductors 15, 16 and 17, respectively. The circuit breaker 14 is provided with operating mechanism including an electromagnet 18 and a spring 19 that is controlled by a mechanism not here disclosed.

The generator 2 is driven by a prime mover 22, such as a steam turbine, and its speed is controlled by a governor mechanism 23 that is driven in accordance with the speed of the prime mover and varies the movement of a pivoted lever 24 and an inlet valve 25 in a supply conduit 26 to control the quantity of motive fluid supplied to the prime mover. A conduit 27 is also provided for conducting the used motive fluid from the prime mover. The adjustment of the governor mechanism is controlled by the bias of a spring 31, one end of which is attached to the lever 24. In order to vary the setting of the governor mechanism to thereby adjust the predetermined speed of the prime mover that the governor mechanism will maintain, the end of the spring 31 that is remote from the lever 24 is affixed to a threaded member 32 that is free to move vertically in an interiorly threaded gearwheel 33. When the gearwheel 33 is revolved in one direction or the other, the threaded shaft member 32 moves upwardly or downwardly thereby varying the tension of the spring 31 to vary the adjustment of the governor mechanism to thereby vary the amount of motive fluid which the governor mechanism will permit to enter the prime mover at a given prime mover speed.

An electric motor 34 is provided for actuating the gearwheel 33 through a worm 35, and comprises an armature winding 36 and a field winding 37. The field winding is connected to be continually energized from the exciter generator 6 through conductors 38, 39, 42 and 43. The armature winding 36 is connected by means of conductors 44 and 45 to movable contact arms 46 and 47 of motor direction controlling switches 48 and 49, respectively. The switch 48 comprises the movable contact arm 46 carrying contact members 52 and 53 for engaging fixed contact members 54 and 55, respectively. An electromagnet 56 is provided for moving the contact lever 46 into one of its two circuit closing positions against the biasing force of a spring 57 that normally urges the lever in a direction to hold the cooperating contact members 53 and 55 in engagement when the electromagnet 56 is deenergized. The motor directional switch 49 is similar in construction to the switch 48, and comprises movable contact members 62 and 63 carried by the contact arm 47 for engaging the fixed contact members 64 and 65, respectively. An electromagnet 66 is provided for actuating the arm 47 against the bias of a spring 67 which normally holds the switch arm in its illustrated position to cause engagement between the contact members 63 and 65.

The stationary contact members 54 and 64 of the switches 48 and 49, respectively, are connected through conductors 38 and 8 to one terminal of the exciter generator 6 and the fixed contact members 55 and 65 of the switches 48 and 49 respectively, are connected through conductors 43 and 7 to the other terminal of the exciter generator 6. Upon the operation of the one or the other of the motor directional switches 48 or 49 to connect the one or the other side of the motor armature 36 to conductor 38, the motor 34 is caused to operate in the one or the other direction.

When the electromagnets of the switches 48 and 49 are not energized the switches are in the positions illustrated in the drawing to close a circuit from one side of the armature winding 36 through conductor 44, switch contact members 53 and 55, conductor 43, switch contact members 63 and 65 and conductor 45 to the other side of the armature winding 36, thus closing a dynamic braking circuit for the motor 34.

Upon the operation of the one or the other of the reversing switches to its second operative position, the motor is so connected to the exciter generator 6 as to be operated in the one or the other direction. The motor directional switches 48 and 49 are controlled by circuits extending through grid controlled tubes 68 and 69, respectively, that are governed by regulating mechanism responsive to the frequencies and phase relation between the two alternating current sources comprising the power circuit 15, 16 and 17 and the generator 2 that is to be connected to the power circuit.

Two transformers T<sub>L</sub> and T<sub>M</sub> are provided, the transformer T<sub>L</sub> having a primary winding 71 that is connected by conductors 72 and 73 to power circuit conductors 16 and 17 and having secondary windings 74, 75 and 76, the circuits of which will be later described. The transformer T<sub>M</sub> is provided with a primary winding 77 connected by conductors 78 and 79 to generator terminal conductors 12 and 13, and is provided with secondary windings 82, 83, 84 and 85.

In order to control the flow of current through the tubes 68 and 69 in accordance with variations in the speed of the generator 2 with respect to the frequency and phase angle of the voltage in the power circuit conductors 16 and 17, a grid controlled tube 86 is provided that is in series with each of the tubes 68 and 69 and that is conductive during a portion of the voltage wave of the generator 2 to permit the flow of current therethrough from a full wave rectifier 87.

The alternating current side of the rectifier 87 is supplied from the secondary windings 74 and 82 of the transformers T<sub>L</sub> and T<sub>M</sub> connected in series so that the alternating current voltage is the voltage between the generator 2 and the power line 15, 16, 17, and the rectifier will give a zero unidirectional voltage output from the rectifier 87 when the phase angle between the two voltages is zero. The unidirectional voltage output $E_{R1}$ of the rectifier 87 therefore varies from zero value at zero angle phase displacement between the machine and the power line to a maximum value at 180° phase angle, and back again to zero at 360° as shown by the curve $E_{R1}$ in Fig. 4.

Figure 2:
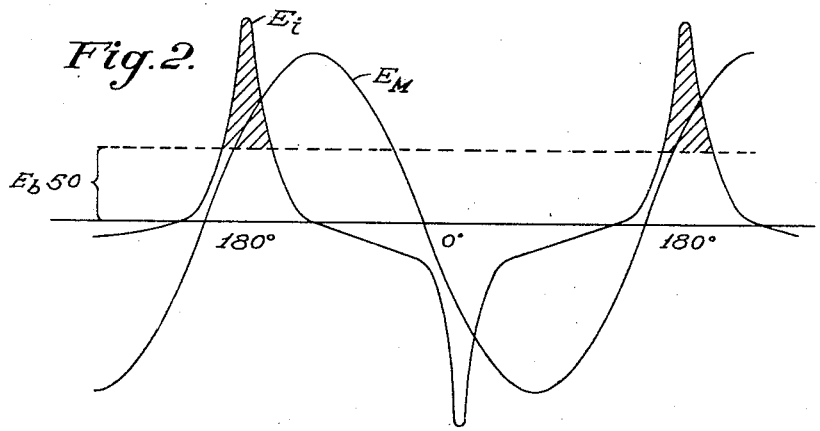

The tube 86 is a three-element tube having an anode 96, a cathode 97 and a grid 102. The tube is controlled by grid voltage consisting of an impulse voltage $E_1$ that is superimposed upon a unidirectional voltage $E_b$. The voltage $E_1$ is supplied from a secondary winding 88 of a saturated transformer 89 the primary winding 92 of which is connected in circuit with the secondary winding 83 of the transformer T<sub>M</sub> through a resistor 93. The voltage $E_b$ is developed across a condenser 94 connected in a loop circuit with the secondary winding 84 of the transformer T<sub>M</sub> and a rectifier element 95. The grid circuit of tube 86 extends from the cathode 97 through conductors 98, 99, capacitor 94, the winding 88 of the saturated transformer 89 and a resistor 101 to the grid 102. Referring to Fig. 2, the curve $E_M$ represents the voltage wave of the generator 2 and the curve $E_1$, the output voltage from the transformer 89 that is superimposed upon the unidirectional voltage $E_b$. Since the transformer 89 is saturated, the curve $E_1$ represents a voltage having an appreciable value for a short part of the cycle only and it is displaced with respect to the voltage $E_M$ an amount determined by the value of the resistor 93, for the purpose of controlling the portions of the cycle during which the tube 86 can be ionized, and which is represented by the shaded portions under the curve $E_1$.

The tubes 68 and 69 are three-element tubes, the tube 68 having an anode 103, cathode 104 and grid 105, and the tube 69 having an anode 106, cathode 107 and grid 108. The tubes 68 and 69 are controlled respectively by grid voltages $E_{gII}$ and $E_{gIII}$. The grid voltage of tube 68, that is $E_{gII}$, is supplied from the secondary winding 75 of the transformer T<sub>L</sub>, the grid control circuit extending from the cathode 104 through conductor 109, resistor 112, conductor 113, the winding 75 and conductor 114 to the grid 105. The grid voltage $E_{gIII}$ is the beat voltage between the generator 2 and the voltage of the power circuit that is developed by connecting the two secondary windings 76 and 85 of the transformers T<sub>L</sub> and T<sub>M</sub>, respectively, in series in "dark lamp" circuit. The grid control circuit extends from the cathode 107 of the tube 69 through conductor 115, resistor 112, conductor 113, transformer winding 76, conductor 116, winding 85, and resistor 117 to the grid 108. The beat voltage varies from zero to a maximum upon variation in the phase angle between the machine voltage and the power circuit voltage as shown by the curve $E_{gIII}$ in Fig. 4.

Figure 3:
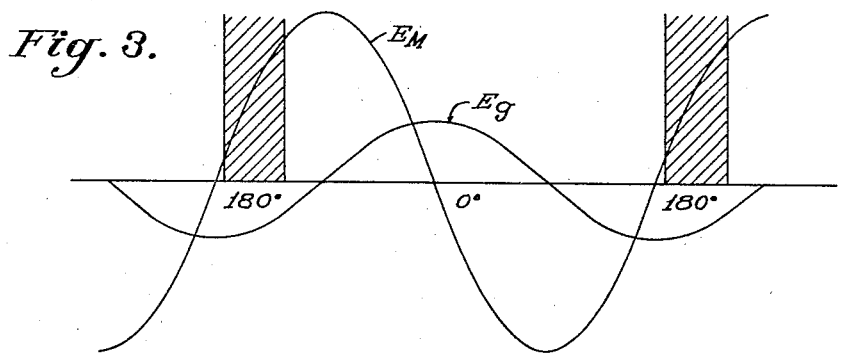
Figure 4:
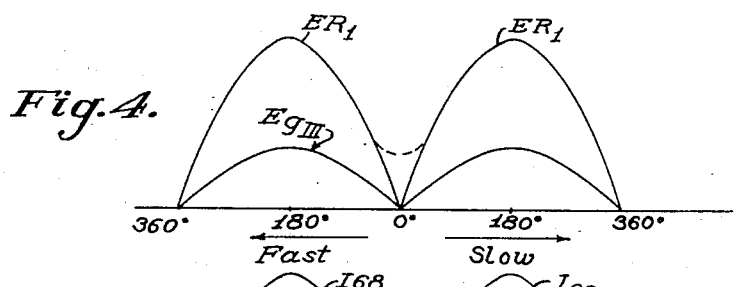
Figure 5:
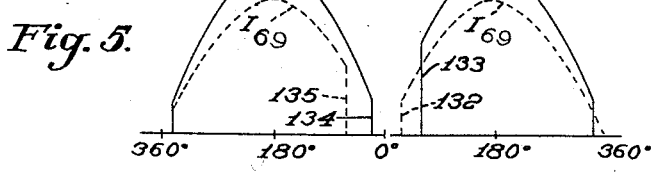

The output circuit from the rectifier 87 which develops a unidirectional voltage across the condenser 118 having a value dependent upon the phase relation between the voltages of the two alternating current sources jointly supplying the rectifier. The output circuit from the rectifier extends through tube 86, conductor 98 to junction point 119, then through one of two branch circuits, one extending from junction point 119 through conductor 99, winding 123 of electromagnet 56, tube 68 and conductor 109 to the junction point 122 and the other branch circuit including conductor 99, the winding 124 of electromagnet 66, the tube 69 and conductor 115 to junction point 122, thence through the resistor 112 and conductor 125 to the negative side of the rectifier 87. The resistor 112 is included in this circuit so that when one of the tubes 68 or 69 becomes conducting the current flow through the resistor 112 will act upon the grid circuit of the other tube to prevent it from becoming conducting until the output voltage $ER_1$ of the rectifier 87 has been reduced to zero. Referring to Figs. 2, 3, 4 and 5, it will be realized that the abscissae in Figs. 2 and 3 are plotted in degrees phase angle of the frequency of the voltage $E_M$, that is, the voltage of the generator 2, while in Figs. 4 and 5, the phase angle is the "beat" phase angle or the angular displacement between the voltages $E_M$ and $E_L$ representing the voltage of the generator 2 and the voltage of the power line, respectively. In Figs. 4 and 5, the zero degrees on the abscissae correspond to an inphase or zero phase angle displacement between the voltages of two alternating current sources. If the speed of the generator 2 is low, the phase angle will increase from zero to the right, or in the direction marked "slow," in Figs. 4 and 5, and if the machine speed is fast with respect to the frequency of the line, the voltage values will be represented by the curves to the left of the zero degree position.

If the phase angle between $E_M$ and $E_L$ is being varied and the current through the tubes 68 and 69 are plotted, assuming that only one of these tubes is connected in the circuit while the test from which the current values are obtained is being made, the curves in Fig. 5 will result. The dotted line curves in Fig. 5, indicated as $I_{69}$, represent the current through the tube 69 and the full line curves $I_{68}$ represent the current through the tube 68. The maximum of the dotted and full line curves represent the same current value but the curves are plotted with different ordinates in order that they may be more clearly distinguished. From these curves it will be seen that when the speed of the generator is slow the current through the tube 69 starts to increase as shown by the portion 132 of the dotted line curve $I_{69}$ before the current will increase as shown by the portion 133 of the full line curve $I_{70}$, indicating that the tube 69 becomes conducting prior to the tube 68, and causing operation of the motor directional switch 49 to cause operation of the motor 34 in a direction to change the setting of the governor 23 to increase the speed of the generator 2. Once the tube 69 has become conducting, the current flow through the resistor 112 will, as explained above, prevent the tube 68 from becoming conducting until the voltage output of the rectifier 87 has become zero. This voltage output is determined by the beat voltage between the generator 2 and the power circuit and becomes zero upon an "in-phase" relation between the two.

If the speed of the generator 2 is high, it will be seen, by reference to Fig. 5, that the current through the tube 68 will increase as indicated by the portion of the curve 134 prior to an increase in the current through the tube 69 as indicated by the portion 135 of the curve, causing the tube 68 to become conducting and operate the switch 48 to cause the motor 34 to operate in a direction to change the setting of a governor 23 to reduce the speed or phase angle relation between the generator 2 and the power line. Here again, once the tube 68 has become conducting it will remain so until the phase angle relation between the incoming machine and the power line circuit has become zero or nearly zero, under which condition the voltage $ER_1$ will become zero.

If the device starts to operate when there is a relatively high frequency, the action of the condenser 118 connected across the output terminals of the rectifier 87 will prevent the voltage $ER_1$ from becoming zero as the phase angle between the two alternating current sources becomes zero, that is to say, it will prevent the voltage $ER_1$ from varying in accordance with the full line curve between the two half-cycle waves and will cause it to vary substantially in accordance with the dotted line between the two voltage waves. For this reason the relays will remain closed continuously when the frequency is high. When the machine approaches synchronous speed, the position of this dotted line transition curve moves downwardly and vanishes permitting the "beat voltage" to become substantially zero, and interrupt the flow of current through the tube 68 or 69 as indicated by the curves in Fig. 5. The curves in Fig. 5 therefore correctly represent the operation of the tubes upon gradual variation of the phase angle between the machine voltage and the power circuit voltage in either direction.

It will be apparent to those skilled in the art that variations in the circuits and apparatus disclosed may be made within the spirit of the invention, and I do not wish to be limited otherwise than by the scope of the appended claims.

I claim as my invention:

1. In a speed-matching system, in combination, a dynamo-electric machine, a speed-reference source of alternating current, an alternating current source that is a measure of the speed of the dynamo-electric machine, speed-control means for governing the speed of the dynamo-electric machine, an electric motor for adjusting the setting of the speed-control means, means for controlling the operation of the motor in the one or the other direction comprising a pair of grid controlled tubes and separate motor direction determining circuits controlled thereby, a grid controlled tube common to the two circuits, means for controlling the grid potential of the last named tube in response to the phase voltage of one of said alternating current sources, means for controlling the grid potential of one of the tubes of said pair in response to the phase voltage of the other of said alternating current sources, and means for controlling the grid potential of the other one of said pair of tubes in response to the beat voltage of the two alternating current sources.

2. In a speed-matching system, in combination, a dynamo-electric machine, a speed-reference source of alternating current, an alternating current source that is a measure of the speed of the dynamo-electric machine, speed-control means for governing the speed of the dynamo-electric machine, an electric motor for adjusting the speed-control means, means for controlling the operation of the motor in the one or the other direction comprising a unidirectional source of energy the output voltage of which varies in accordance with the phase displacement between the voltages of the two above-named alternating current sources, a pair of motor direction determining circuits supplied from said source, a pair of grid controlled tubes for controlling said circuits, a grid controlled tube common to the two circuits, means for controlling the grid potential of the last named tube in response to the phase voltage of one of said alternating current sources, means for controlling the grid potential of one of the tubes of said pair in response to the phase voltage of the other of said alternating current sources, and means for controlling the grid potential of the other one of said pair of tubes in response to the beat voltage of the two alternating current sources.

3. In a speed-matching system, in combination, a dynamo-electric machine, a speed-reference source of alternating current, an alternating current source that is a measure of the speed of the dynamo-electric machine, speed-control means for governing the speed of the dynamo-electric machine, an electric motor for adjusting the speed-control means, means for controlling the operation of the motor in the one or the other direction comprising a full wave rectifier supplied from two series connected transformers energized, respectively, from the two above-named alternating current sources, a pair of motor direction determining circuits supplied from said source, a pair of grid controlled tubes for controlling said circuits, a grid controlled tube common to the two circuits, means for controlling the grid potential of the last named tube in response to the phase voltage of one of said alternating current sources, means for controlling the grid potential of one of the tubes of said pair in response to the phase voltage of the other of said alternating current sources, and means for controlling the grid potential of the other one of said pair of tubes in response to the beat voltage of the two alternating current sources.

4. In a speed-matching system, in combination, an alternating current synchronous generator, a speed-reference source of alternating current, speed-control means for governing the speed of the dynamo-electric machine, an electric motor for adjusting the setting of the speed-control means, a source of electric energy for driving the motor comprising a rectifier supplied with alternating voltage that is a measure of the phase position between the voltages of the generator and the speed-reference source, and means including a pair of tubes for controlling the operation of the electric motor in the one or the other direction upon a variation in the alternating voltage of the generator in the one or the other direction from that of the speed-reference source.

5. In a speed-matching system, in combination, an alternating current generator, a speed-reference source of alternating current, speed-control means for governing the speed of the dynamo-electric machine, an electric motor for adjusting the speed-control means, means for controlling the operation of the motor in the one or the other direction comprising a rectifier for supplying unidirectional current at a voltage that is a measure of the phase displacement between the generator voltage and the voltage of the speed-reference source, a pair of grid controlled tubes and separate motor direction determining circuits controlled thereby and supplied from said rectifier, a grid controlled tube common to the two circuits, means for controlling the grid potential of the last named tube in response to the phase voltage of one only of said alternating current sources, means for controlling the grid potential of one of the pair of tubes in response to the phase voltage of the other of said alternating current sources, and means for controlling the grid potential of the other one of said pair of tubes in response to the beat voltage of the two alternating current sources.

6. In a speed-matching system, in combination, an alternating current generator, a speed-reference source of alternating current, speed-control means for governing the speed of the dynamo-electric machine, an electric motor for adjusting the speed-control means, a control circuit for the motor and means controlled by the phase relation between the generator voltage and the voltage of the speed-reference source for controlling the supply of unidirectional current to the control circuit, and means including a pair of tube rectifiers for controlling the operation of the electric motor in the one or the other direction upon a variation in the frequency of said second named alternating current source in the one or the other direction from that of the speed-reference source.

7. In a system for matching the speed and phase-angle relation between two alternating current sources of electric energy, an alternating current generator, a speed-reference source of alternating current, speed control means for governing the speed of the alternating current generator, electro-responsive means for adjusting the speed control means, means for controlling the operation of the electro-responsive means for correcting the speed of the generator in the one or the other direction comprising a unidirectional source of energy, the output voltage of which varies from zero to a maximum in accordance with the phase displacement between the voltages of the two above named alternating current sources from in phase to phase opposition, a pair of direction determining circuits supplied from said last named source, a pair of grid-controlled tubes for controlling said circuits, a grid-controlled tube common to the two circuits, means for controlling the grid potential of the last-named tube in response to the phase voltage of one of said alternating current sources, means for controlling the grid potential of one of the tubes of said pair in response to the phase voltage of the other of said alternating current sources, and means for controlling the grid potential of the other one of said pair of tubes in response to the beat voltage of the two alternating current sources, said grid control circuits causing the first-named of said pair of tubes to become conducting prior to the other of said pair of tubes when the phase relation between the voltage of the alternating current generator varies with respect to the voltage of the alternating current speed-reference source in one direction from zero and causing the other of said pair of tubes to become conducting prior to the first when the phase relation of the generator varies in the other direction from zero with respect to the voltage of the speed-reference source, and means effective upon one of said pair of tubes becoming conducting for preventing the other of said pair of tubes from becoming conducting until the voltage of said above-named unidirectional source is reduced to zero.

FINN H. GULLIKSEN.